United States Patent
Boberg

Patent Number: 6,155,365
Date of Patent: Dec. 5, 2000

[54] BRAKE BLENDING STRATEGY FOR A HYBRID VEHICLE

[75] Inventor: Evan S. Boberg, Hazel Park, Mich.

[73] Assignee: Chrysler Corporation, Auburn Hills, Mich.

[21] Appl. No.: 09/076,379

[22] Filed: May 12, 1998

[51] Int. Cl.$^7$ .............................. B60K 7/00; B60T 13/74; B60T 8/64

[52] U.S. Cl. .............................. 180/65.2; 303/3; 303/152

[58] Field of Search .................. 180/65.2, 65.4, 180/65.6; 303/3, 15, 20, 152

[56] References Cited

U.S. PATENT DOCUMENTS

| | | | |
|---|---|---|---|
| 4,591,016 | 5/1986 | Matthews | 180/165 |
| 4,962,969 | 10/1990 | Davis | 303/3 |
| 5,253,929 | 10/1993 | Ohori | 303/3 |
| 5,322,352 | 6/1994 | Ohno et al. | 303/3 |
| 5,326,158 | 7/1994 | Ohori et al. | 303/3 |
| 5,378,053 | 1/1995 | Patient et al. | 303/3 |
| 5,450,324 | 9/1995 | Cikanek | 303/3 |
| 5,511,859 | 4/1996 | Kade et al. | 303/3 |
| 5,578,911 | 11/1996 | Carter et al. | |
| 5,839,533 | 11/1998 | Mikami et al. | 180/165 |
| 5,853,229 | 12/1998 | Willmann et al. | 303/3 |
| 5,915,801 | 6/1999 | Taga et al. | 303/152 |
| 5,923,093 | 7/1999 | Tabata et al. | 290/40 |

*Primary Examiner*—Lanna Mai
*Assistant Examiner*—Jeff Restifo

[57] ABSTRACT

A hybrid electric powertrain system is provided including a transmission for driving a pair of wheels of a vehicle and a heat engine and an electric motor/generator coupled to the transmission. A friction brake system is provided for applying a braking torque to said vehicle. A controller unit generates control signals to the electric motor/generator and the friction brake system for controllably braking the vehicle in response to a drivers brake command. The controller unit determines and amount of regenerative torque available and compares this value to a determined amount of brake torque requested for determining the control signals to the electric motor/generator and the friction brake system.

9 Claims, 2 Drawing Sheets

BRAKE BLENDING STRATEGY FOR A HYBRID VEHICLE

STATEMENT OF GOVERNMENT INTEREST

The government of the United States of America has rights in this invention pursuant to Subcontract No. ZAN-6-16334-01 awarded by the U.S. Department of Energy.

FIELD OF THE INVENTION

The present invention relates generally to a hybrid electric vehicle and, more particularly, to an electric motor/regenerator and friction brake torque distribution control strategy for a hybrid electric vehicle.

BACKGROUND AND SUMMARY OF THE INVENTION

Since the invention of power vehicles, many different powertrain systems have been attempted, including a steam engine with a boiler or an electric motor with a storage battery. It was, however, the discovery of petroleum in 1856 and the fourstroke internal combustion engine invented by Otto in 1876, that provided the impetus for the modern motor vehicle industry.

Although fossil fuel emerged as the fuel of choice for motor vehicles, recent concerns regarding fuel availability and increasingly stringent federal and state emission regulations have renewed interest in alternative fuel powered vehicles. For example, alternative fuel vehicles may be powered by methanol, ethanol, natural gas, electricity, or a combination of these fuels.

A dedicated electric powered vehicle offers several advantages: electricity is readily available, an electric power distribution system is already in place, and an electric powered vehicle produces virtually no emissions. There are, however, several technological disadvantages that must be overcome before electric powered vehicles gain acceptance in the marketplace. For instance, the range of an electric powered vehicle is limited to approximately 100 miles, compared to approximately 300 miles for a similar fossil fuel powered vehicle. Further, the costs of batteries are significantly more than that of a comparable fossil fuel powered vehicle.

Hybrid powered vehicles, powered by both an internal combustion engine and an electric motor, have been widely proposed for overcoming the technical disadvantages of a dedicated electric vehicle while still offering an increased efficiency. The performance and range characteristics of a hybrid powered vehicle is comparable to a conventional fossil fuel powered vehicle. However, a great deal of development is still necessary in order to provide a hybrid electric vehicle which would be widely accepted by the consuming public.

The present invention deals with the issue of determining a desirable amount of braking torque distribution by an electric motor/generator and a friction brake system of a hybrid electric vehicle in order to provide efficient regeneration of braking energy into stored energy.

Accordingly, it is an object of the present invention to provide an improved brake blending strategy for a hybrid powertrain system.

To achieve the foregoing object, the present invention provides a hybrid electric powertrain system for a vehicle, including a transmission for driving a pair of wheels of the vehicle. A heat engine and an electric motor/generator are coupled to the transmission. A friction brake system is provided for applying a braking torque to the vehicle. A controller unit is provided for generating control signals to the electric motor/generator and the friction brake system for controllably braking the vehicle in response to a driver's brake command. The controller unit determines an amount of regenerative torque available and compares this value to a determined amount of brake torque requested for determining the control signals to the electric motor/generator and the friction brake system.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
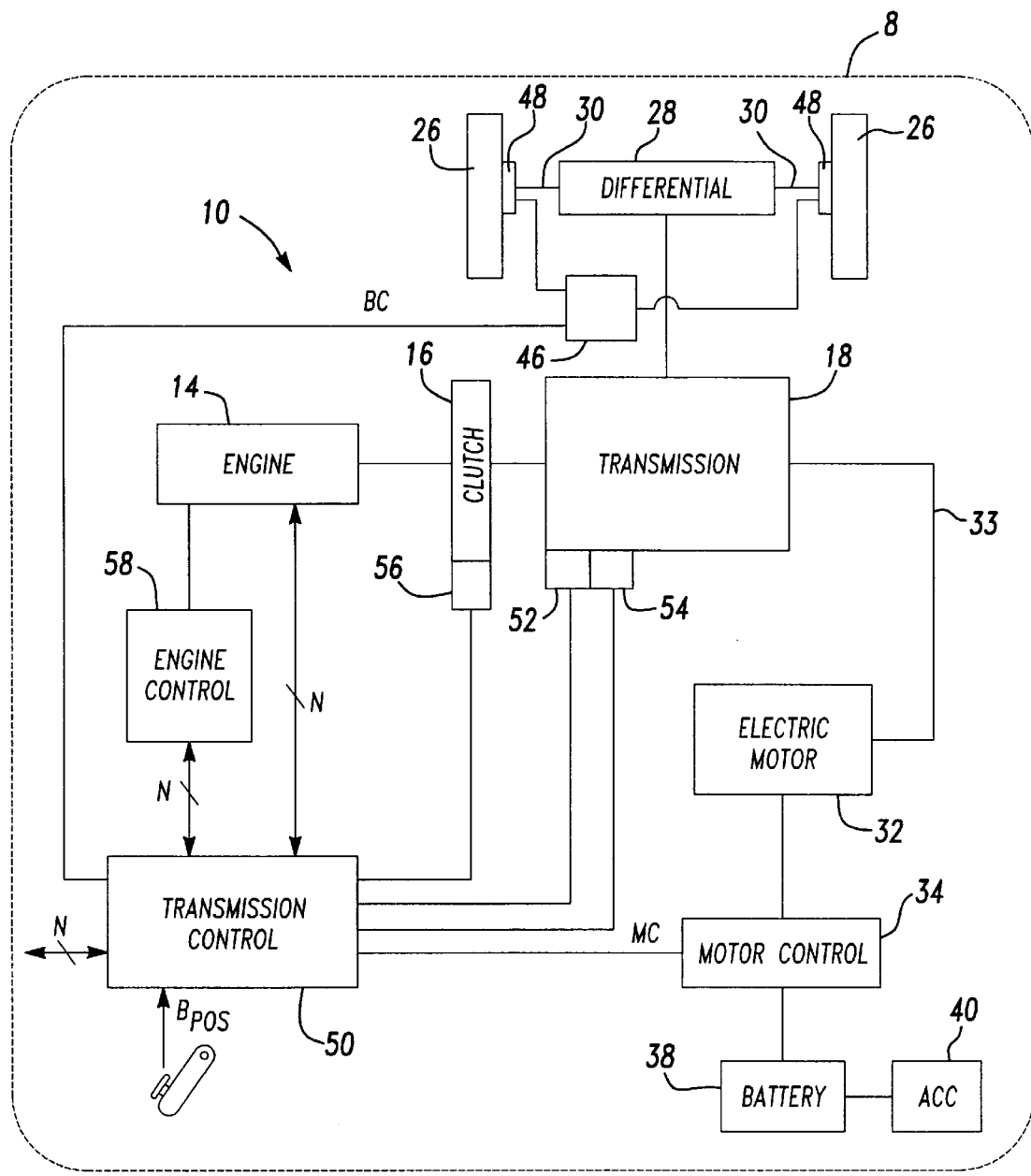
FIG. 1 is a schematic diagram of a hybrid powertrain system for a motor vehicle according to the present invention.

Referring to FIG. 1, a hybrid powertrain system 10, according to the present invention, is illustrated for a motor vehicle, generally shown at 8. The hybrid powertrain system 10 includes a heat engine 14 operating on a hydrocarbon based or fossil fuel. In this example, the engine 14 is a compression-ignited engine fueled by a diesel fuel. Preferably, the engine 14 is sized comparable to an engine for a non-hybrid motor vehicle.

The hybrid powertrain system 10 also includes a clutch mechanism 16, as is known in the art, for operably interconnecting engine 14 and transmission 18. The Clutch mechanism 16 compensates for the difference in rotational speed of engine 14 and transmission 18, to smooth engagement between engine 14 and transmission 18.

Transmission 18 connects to engine 14 through clutch 16 and transmits engine rotation and power at various ratios to a pair of drive wheels 26 of the motor vehicle. Thus, transmission 18 enables the motor vehicle 8 to accelerate through predetermined gear ratios, while engine 14 functions within a predetermined operating range. Examples of known transmission types include an automatic transmission, a manual transmission and a continuously variable transmission. It should be appreciated that in a preferred embodiment transmission 18 is a four or five-speed manual transmission as is well known in the art.

Transmission 18 drives a differential unit 28. Differential unit 28 engages a pair of axle shafts 30 which are operably connected to the pair of wheels 26.

The hybrid powertrain system 10 also includes an electric motor 32 operably connected to transmission 18 at the opposite end of an input shaft from clutch 16. Electric motor 32 is connected to the input shaft opposite from clutch 16 by a gear train 33. The electric motor 30 is able to provide both positive and regenerative torque, by functioning as a motor and a generator, respectively. An example of an electric motor 32 is an induction motor or a permanent magnet motor, such as manufactured by Delphi Electronics Corporation.

As a generator, electric motor 32 produces a regenerative torque, preferably as an alternating current (A/C), which is transferred to a control mechanism, such as a motor controller 34. Motor controller 34 changes the alternating current into a direct current (D/C), as is well known in the art. The direct current may then be transmitted to an energy storage apparatus 38, such as a battery. Alternatively, as a motor, the electric motor 32 produces a positive torque that is applied to the input shaft of the transmission 18 and is ultimately used to drive wheels 26.

Motor vehicle 8 is provided with a regenerative braking system, capable of capturing kinetic energy from the momentum of the motor vehicle as it is slowing down and storing this energy as potential energy in the energy storage apparatus 38 to be described. Electric motor 32 is controlled to slow the motor vehicle down by applying a braking force that slows down the rotation of the input shaft. Electric motor 32 functions as a generator and captures the reverse energy flow. Motor vehicle 8 is also provided with a friction brake system which includes a brake controller 46 and a plurality of friction brakes assemblies 48 which apply a braking force to the wheels 26 of the vehicle 8.

Hybrid powertrain system 10 also includes a transmission controller 50, such as an electronic control unit. Transmission controller 50 enables electronic control of transmission 18 to enable the transmission 18 to be configured as a manual-style transmission, but to be operated from a drivers standpoint as an automatic transmission. To effect such operation, transmission 18 has a pair of actuators 52 and 54 which simulate positioning of the stick shift actuators as in a conventional manual transmission. Further, actuator 56 enables operation of clutch 16 in replacement of a clutch pedal as on a conventional manual transmission. In order to generate such control signals, transmission controller 50 receives input signals from engine 14 or an engine controller 58. Examples of such information received from engine 14 or engine controller 58 include vehicle speed, RPM, or the like. Similarly, transmission controller 50 generates output signals to control actuators 52, 54, and 56 and also outputs diagnostic and other communication signals to engine 14 and/or engine controller 58. Transmission controller 50 may also receive other vehicle condition signals, depending on a particular configuration of the transmission 18.

In operation, as will be described in greater detail herein, transmission controller 50 receives input signals from engine 14, engine controller 58, clutch 16, clutch actuator 56, transmission 18, and from additional sensors. Actuator 56 is preferably a rotary actuator which causes linear movement to effect engagement and disengagement of clutch 16. With respect to actuators 52 and 54, these actuators combine to mimic movement of the shift lever in a conventional manual transmission. That is, in visioning the standard "H" shaped shift configuration, actuator 52 may operate as the cross over actuator, i.e., determining what leg of the "H" the shifter is in. Similarly, actuator 54 operates as a select actuator which mimics an upward or downward movement of the shifter within the leg of the H. The actuators 52, 54, and 56 receive control signals from transmission controller 50 to operate the shifting portion of transmission 18 as in a conventional manual transmission. Further, transmission controller 50 sends control signals to electric motor 32 through motor controller 34, to effect activation and deactivation of electric motor 32 as determined by the control strategy described herein. Transmission controller 50 also sends control signals to the friction brake controller 46 as determined by the control strategy described herein.

Hybrid powertrain system 10 includes an energy storage apparatus 38, such as battery, to store potential energy for later use by the motor vehicle. For example, the potential energy stored in the battery may be transferred, as DC current, to operate an accessory component 40. In a typical motor vehicle, engine 14 operably supplies a battery with potential energy. In this example, electric motor 32 operating as a generator supplies battery 38 with potential energy for storage.

Hybrid powertrain system 10 includes at least one accessory component 40. An example of an accessory component may be a power steering pump, a water pump, a lighting system, and a heating and cooling system, which are all conventional and well known in the art. Accessory components 40 are usually mechanically driven by the engine 14 or electrically powered with energy from battery 38. For example, accessory component 40, such as the power steering pump, is operably connected to engine 14 and mechanically driven by engine 14. The lighting system relies on energy supplied by the battery 38, as a source of power.

Upon command from the motor controller 34, battery 38 supplies potential energy, such as a D/C current, to motor controller 34, which converts it into an A/C current. The A/C current is directed to the electric motor 32, causing it to act as a motor and produce a positive torque. The positive torque is applied to the transmission 18, which in turn induces the rotation of the axle shaft 30 and the rotation of the drive wheels 26 of the motor vehicle.

Figure 3:
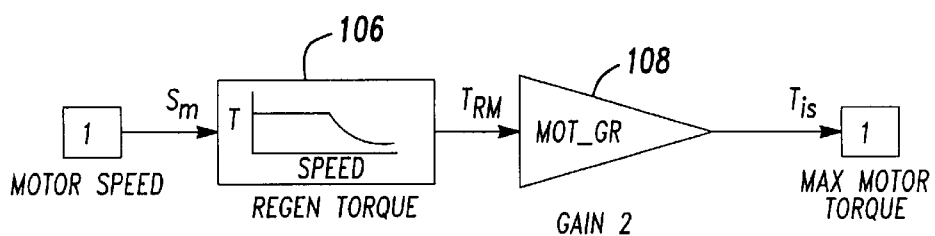
FIG. 3 is a data flow diagram illustrating the calculation of the motor regeneration torque available according to the principles of the present invention.
Figure 2:
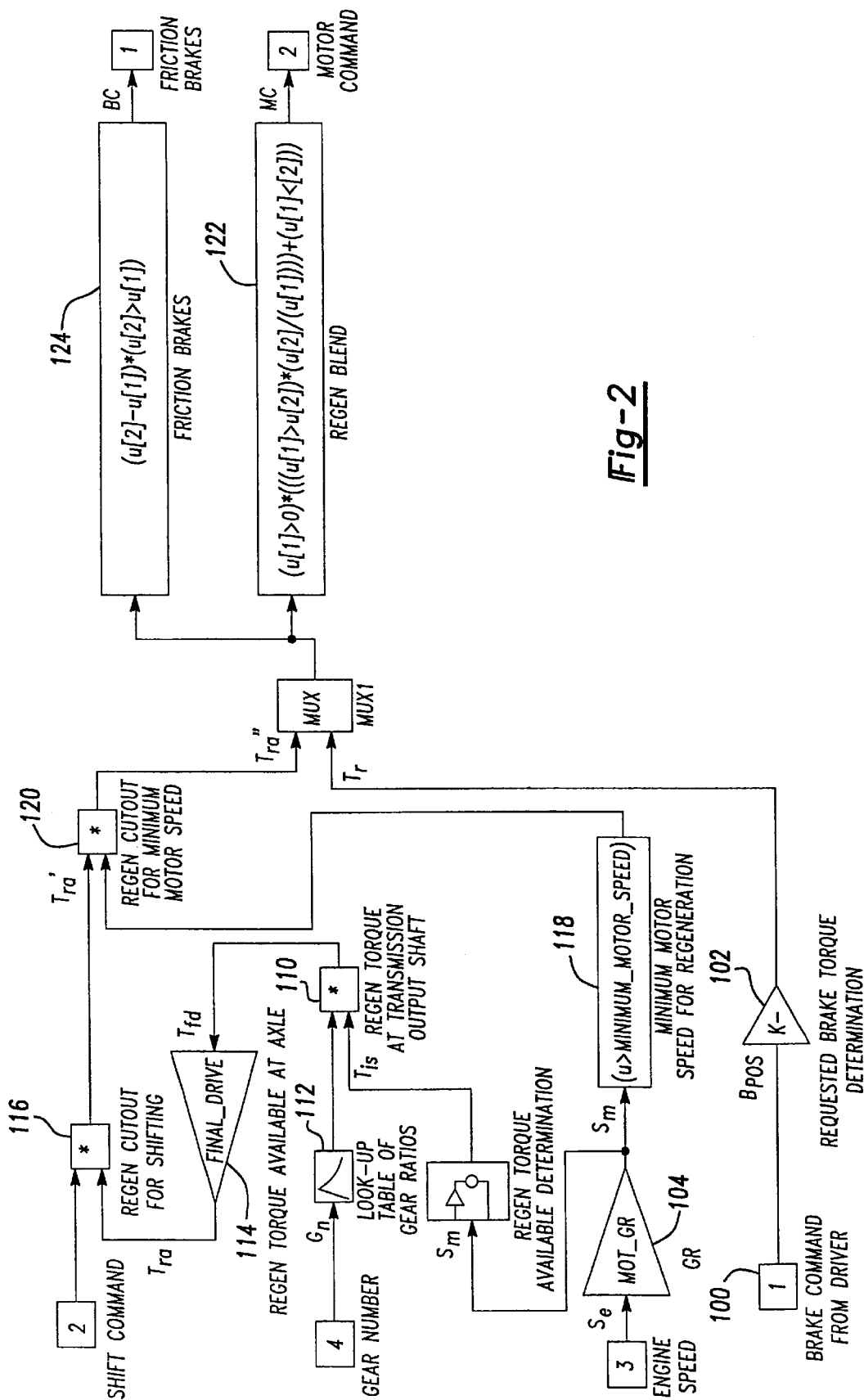
FIG. 2 is a data flow diagram showing the brake blending control strategy for the hybrid powertrain system according to the principles of the present invention.

With reference to FIGS. 2–3, a brake blending strategy for a hybrid vehicle will be described.

A braking command $B_{pos}$ from the driver is received as input 1 (100). The brake command $B_{pos}$ is multiplied by a gain K (102) to determine the total brake torque requested at the axle $T_r$. The torque requested at the axle $T_r$ is supplied as a second input to multiplexer Mux1.

In order to determine the regenerative torque available, the engine speed $S_e$ (input 3) is multiplied by the motor to engine gear ratio (mot_gr) (104) which provides a motor speed $S_m$ for the regenerative torque available determination. As shown in FIG. 3, the regenerative torque available from the motor $T_{rm}$ is determined from a lookup table (106) based upon the motor speed $S_m$. The torque $T_{rm}$ from the table is then multiplied by the motor to engine gar ratio (108) to determine the torque available at the transmission input shaft $T_{is}$.

Available regenerative torque to the final drive $T_{fd}$ is determined (110) by multiplying the torque available at the transmission input shaft $T_{is}$ by the gear ratio determined in the Look-Up Table of gear ratios (112) from the gear number $G_n$. This torque $T_{fd}$ is then multiplied by the gear ratio of the final drive (114) to determine the regenerative torque available at the axle $T_{ra}$.

If a shift is commanded as determined from input 2, the regenerative torque available is set to zero by providing a boolean value of 0 or 1 and multiplying the boolean value by the regenerative torque available at the axle $T_{ra}$ (116). In this case, if a shift sequence is taking place, the boolean value is set to zero. Therefore, during a shift sequence, the regenerative torque available $T_{ra}'$ is set to zero.

If the motor speed $S_m$ is below a predetermined level as prescribed as a minimum motor speed for regeneration (118), then a boolean value of zero is multiplied by the total regeneration torque available value $T_{ra}'$ at block (120). Accordingly, the total regeneration torque available $T_{ra}''$ would then be set to zero in order to provide a regeneration cutout for the minimum motor speed. If the motor speed $S_m$ is above the predetermined level, then a boolean value of one is multiplied by the value $T_{ra}'$. The total regenerative torque available $T_{ra}''$ is then input into the first input of the multiplexer (Mux1).

A motor command for regeneration is determined in block 122 labeled "regen blend." If no regenerative torque $T_{ra}''$ is available, then the command will be set to zero by the boolean multiplier u[1]>0 which will be equal to zero if the value $T_{ra}''$ input into the first input of the multiplexer (Mux1) is not greater than zero. However, if the value $T_{ra}''$ is greater than zero, the boolean multiplier value would be one.

If the requested braking torque $T_r$(u[2]) is greater than the regeneration torque available $T_{ra}''$(u[1]), then the motor commands MC for regeneration is set to 1. This is because the boolean multiplier u[1]>u[2] would be false and therefore, the boolean multiplier (u[1]>u[2]) in the equation ((u[1]>u[2])*(u[2]/u[1])) would be equal to zero while the addition of the boolean value for (u[1]<u[2]) would be one. Accordingly, the equation (u[1]>0)*(((u[1]>u[2])*(u[2]/u[1]))+(u[1]<u[2])) would result in 0+1=1. If the requested braking torque $T_r$ is less than the regeneration torque available $T_{ra}''$, then block 122 would provide a motor command MC for regeneration that is proportional to the difference of the requested braking torque and the regeneration torque available. In other words, the equation (u[1]>0)*(((u[1]>u[2])*u[2]/u[1]))+(u[1]<u[2]))

would result in a motor command

MC=1*(1*u[2]/u[1])+0=u[2]/u[1]).

This command MC is then sent to a motor controller 34.

If the requested braking torque $T_r$ is in excess of the regeneration torque available $T_{ra}''$(u[2]>u[1]), then a brake signal BC representative of the difference between the requested braking torque $T_r$ and the regeneration torque available $T_{ra}''$(u[2]−u[1]) is sent to the brake controller 46 at block 124. If $T_r$ is less than $T_{ra}''$, then the boolean multiplier (u[2]>u[1]) would be zero resulting in a brake signal BC of zero.

According to the present invention, a brake blending strategy is provided for a hybrid electric vehicle in order to efficiently regenerate stored energy from braking energy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid electric powertrain system for a vehicle, comprising:

a transmission for driving a pair of wheels of said vehicle;

a heat engine coupled to said transmission;

an electric motor/generator coupled to said transmission;

a friction brake system for applying brake torque to said vehicle; and a controller unit for generating control signals to said electric motor/generator and said friction brake system for controllably braking said vehicle in response to a driver's brake command, wherein said controller unit determines an amount of regenerative torque available, by multiplying the torque available at the transmission input shaft by a drivetrain gear ratio, and compares this value to a determined amount of brake torque requested for determining said control signals to said electric motor/generator and said friction brake system.

2. The hybrid electric vehicle according to claim 1, wherein if said determined amount of regenerative torque available exceeds said determined amount of brake torque requested, said electric motor/generator is given a control signal for providing a regenerative torque equal to the amount of brake torque requested.

3. The hybrid electric vehicle according to claim 1, wherein said amount of regenerative torque available is determined based upon the motor/generator speed.

4. The hybrid electric vehicle according to claim 1, wherein said amount of regenerative torque available is set to zero during a shift sequence.

5. The hybrid electric vehicle according to claim 1, wherein said amount of regenerative torque available is set to zero if the motor speed does not exceed a minimum predetermined motor speed.

6. A method for controlling braking of a vehicle having a friction brake system and a hybrid electric powertrain system including a heat engine and an electric motor/generator each coupled to a transmission for driving a pair of wheels of said vehicle, comprising the steps of:

determining an amount of brake torque requested based upon a brake command from a driver;

determining an amount of regenerative torque available by multiplying the torque available at the transmission input shaft by a drivetrain gear ratio; and comparing said amount of brake torque requested and said amount of regenerative torque available and generating control signals to said electric motor/generator and said friction braking system for braking said vehicle.

7. The method according to claim 6, wherein said step of determining an amount of regenerative torque available is based upon the motor speed and the transmission gear ratio.

8. The method according to claim 6, wherein said step of determining an amount of regenerative torque available includes setting the amount of regenerative torque available to zero when a speed of said electric motor/generator is below a predetermined level.

9. The method according to claim 6, wherein said step of determining an amount of regenerative torque available includes setting the amount of regenerative torque available to zero when a shift sequence is being performed.

* * * * *